(12) United States Patent
Kurane

(10) Patent No.: US 7,643,075 B2
(45) Date of Patent: Jan. 5, 2010

(54) IMAGE PICKUP DEVICE

(75) Inventor: Haruhisa Kurane, Suwa (JP)

(73) Assignee: Seiko Epson Corporation (JP)

( * ) Notice: Subject to any disclaimer, the term of this patent is extended or adjusted under 35 U.S.C. 154(b) by 619 days.

(21) Appl. No.: 11/294,889

(22) Filed: Dec. 5, 2005

(65) Prior Publication Data

US 2006/0170662 A1    Aug. 3, 2006

(30) Foreign Application Priority Data

| Dec. 7, 2004 | (JP) | ............................. 2004-353655 |
| Nov. 8, 2005 | (JP) | ............................. 2005-323170 |

(51) Int. Cl.
  *H04N 3/14* (2006.01)
  *H04N 5/235* (2006.01)

(52) U.S. Cl. ...................... 348/297; 348/362

(58) Field of Classification Search .................. 348/64, 348/297, 333.01, 333.05; 396/287, 311, 396/374
See application file for complete search history.

(56) References Cited

U.S. PATENT DOCUMENTS

| 6,452,152 | B1 | 9/2002 | Yang |
| 6,498,576 | B1 | 12/2002 | Tian et al. |
| 6,516,154 | B1 * | 2/2003 | Parulski et al. ............... 396/287 |
| 6,529,242 | B1 * | 3/2003 | Panicacci .................... 348/308 |
| 6,778,212 | B1 | 8/2004 | Deng et al. |
| 6,791,611 | B2 | 9/2004 | Yang |
| 6,809,666 | B1 | 10/2004 | Ewedemi et al. |
| 6,831,684 | B1 | 12/2004 | Ewedemi et al. |
| 6,833,864 | B1 | 12/2004 | Ashida |
| 6,922,210 | B2 | 7/2005 | Yang et al. |
| 6,930,722 | B1 | 8/2005 | Nakamura et al. |
| 6,952,234 | B2 | 10/2005 | Hatano |
| 6,970,195 | B1 | 11/2005 | Bidermann et al. |
| 6,975,355 | B1 | 12/2005 | Yang et al. |
| 6,985,181 | B2 | 1/2006 | Ewedemi et al. |
| 7,038,716 | B2 | 5/2006 | Klein et al. |
| 2001/0040632 | A1 | 11/2001 | Yang et al. |
| 2003/0117386 | A1 | 6/2003 | Mabuchi |
| 2005/0231619 | A1 | 10/2005 | Nakamura et al. |

FOREIGN PATENT DOCUMENTS

| CN | 1467991 | 1/2004 |
| JP | 10-243288 | 9/1998 |
| JP | 2000-023044 | 1/2000 |
| JP | 2000-032303 | 1/2000 |

(Continued)

*Primary Examiner*—Nhan T Tran
*Assistant Examiner*—Akshay Trehan
(74) *Attorney, Agent, or Firm*—Harness, Dickey & Pierce, P.L.C.

(57) ABSTRACT

When a saturation flag of HDR-RAW data accumulated in a BRAM data accumulating section 19 is "1" and a saturation flag of HDR-RAW data accumulated in an input data accumulating section 18 is "0," i.e., when a pixel being in a saturated state no longer attains the saturated state, the HDR-RAW data accumulated in the input data accumulating section 18 are recorded to BRAN 10 instead of the HDR-RAW data recorded that far. Therefore, the image data of the pixel within the second image is recorded, and it is not necessary to arrange the delay element. As a result, manufacture cost can be reduced by the amount for arranging the delay element.

11 Claims, 8 Drawing Sheets

FOREIGN PATENT DOCUMENTS

| | | |
|---|---|---|
| JP | 2000-050174 | 2/2000 |
| JP | 2001-285721 | 10/2001 |
| JP | 2003-198948 | 7/2003 |
| JP | 2004-015291 | 1/2004 |
| JP | 2004-159274 | 6/2004 |

* cited by examiner

ATTRIBUTE DATA (S, T, E)   DIGITAL IMAGE DATA D

| S | T1 | T0 | E1 | E0 | D9 | D8 | D7 | D6 | D5 | D4 | D3 | D2 | D1 | D0 |

(E1, E0) : EXPOSURE CODE
(T1, T0) : MAKING TIME CODE
S : SATURATION FLAG

IMAGE PICKUP DEVICE

FIELD OF THE INVENTION

The present invention relates to an image pickup device able to obtain an image of a wide dynamic range.

BACKGROUND OF THE INVENTION

In a conventional image pickup device, a first image is picked up for a standard exposure time. Thereafter, a second image is picked up by an image pickup unit for an exposure time shorter than the standard exposure time. A pixel reaching an upper limit value of the dynamic range with respect to a brightness value within this picked-up first image is replaced with a pixel within the above second image by a synthesizing unit so that the image of the wide dynamic range is generated.

In such an image pickup device, image data of each pixel of the first image are generally acquired by the synthesizing unit simultaneously with image data of the second image as a replacing candidate by delaying the image data of the first image by a buffer (e.g., see JP-A-2003-198948).

However, such an image pickup device requires a buffer having a large capacity for delaying the first image picked up for the standard exposure time. Further, the buffer capacity (delay time) depends on the construction of the image pickup unit. Further, when the delay time is changed in accordance with an image pickup condition, a complicated circuit that controls a change in the delay time is required. Therefore, there is a fear that the cost to manufacture the device is raised. Further, the exposure time is, conventionally, fixed at a period of one frame, and the synthesizing unit is constructed by using this fixed period. However, when the exposure time is dynamically changed, flexible coping is required in the synthesizing unit. Further, in an image pickup element having a plurality of channel outputs, each channel outputs a separate pixel series. Its construction therefore, becomes complicated when the exposure time is changed.

An object of the invention is to solve the above problems of the above conventional image pickup device, and to provide an image pickup device able at a reduced manufacture cost.

SUMMARY OF THE INVENTION

To solve the above problems, an image pickup device of the invention comprises an image pickup unit having an electronic shutter function that is able to change an exposure time; an attribute information adding unit for adding attribute information that includes an image pickup condition of a pixel of an image picked up by this image pickup unit to each pixel; and a pickup image generating unit for generating the pickup image by selecting the image every pixel on the basis of this added attribute information.

The pickup image generating unit may have a selecting condition judging unit for judging whether the attribute information added to each pixel by the attribute information adding unit satisfies a selecting condition for selecting a pixel that corresponds to the attribute information or not, and may also have a selecting pixel synthesizing unit for selecting a pixel that corresponds to the attribute information judged to satisfy the selecting condition, and generating the pickup image.

Further, the image pickup device may further comprise a recording unit for recording the image picked up by the image pickup unit. When it is judged that the attribute information of the pixel included in the image picked up later by the image pickup unit satisfies the selecting condition, the selecting pixel synthesizing unit may replace this pixel with a corresponding pixel of the pickup image recorded to the recording unit.

Further, the attribute information of the pixel may include at least one of information that shows the exposure time of the pixel, information showing that a brightness value of the pixel is an upper limit value of a dynamic range, and information showing an image pickup time of the pixel.

Further, the selecting condition judging unit may judge at least one of whether or not the exposure time of an object pixel of the image that is newly picked up is longer than the exposure time of the corresponding pixel of the pickup image recorded to the recording unit, whether or not the brightness value of the object pixel of the image newly picked up is greater than the upper limit value of the dynamic range and the brightness value of the corresponding pixel of the pickup image recorded to the recording unit is smaller than the upper limit value of the dynamic range, and whether or not the image pickup time of the object pixel of the image newly picked up is separated from the image pickup time of the corresponding pixel of the pickup image recorded to the recording unit by a predetermined time or more.

Further, the selecting condition judging unit may sequentially execute from a higher preferential order a processing for judging whether the selecting condition of the pixel is satisfied or not, first judgment processing of a first preferential order for judging whether or not the image pickup time of an object pixel of the image newly picked up is separated from the image pickup time of the corresponding pixel of the pickup image recorded to the recording unit by a predetermined time or more on the basis of the attribute information added to each pixel; second judgment processing of a second preferential order for judging whether or not the brightness value of the object pixel of the image newly picked up is smaller than the upper limit value of the dynamic range and the brightness value of the corresponding pixel of the pickup image recorded to the recording unit is greater than the upper limit value of the dynamic range; and third judgment processing of a third preferential order for judging whether or not the exposure time of the object pixel of the image newly picked up is longer than the exposure time of the corresponding pixel of the pickup image recorded to the recording unit when the brightness value of the object pixel of the image newly picked up is smaller than the upper limit value of the dynamic range and the brightness value of the corresponding pixel of the pickup image recorded to the recording unit is smaller than the upper limit value of the dynamic range. The judgment processing may be terminated when the selecting condition is satisfied in one of the first to third judgment processings.

In accordance with such constructions, for example, as the attribute information of the pixel of the picked-up image, information showing whether the brightness value of this pixel is a maximum value of the dynamic range or not is added. When the brightness value of the object pixel of the image newly picked up is smaller than the upper limit value of the dynamic range and the brightness value of the object pixel of the image precedently picked up is the upper limit value of the dynamic range, i.e., when the pixel being in the saturated state so far no longer attains the saturated state, the object pixel is recorded to the recording unit instead of this pixel. Thus, an unsaturated image, i.e., the image of a wide dynamic range can be generated. Further, as the attribute information of the pixel of the picked-up image, information showing the exposure time of this pixel is added, and the image always unsaturated and having a long exposure time is recorded so that the image of a high S/N can be generated. Further, as the attribute information of each pixel of the picked-up image, information showing the exposure time of this pixel, information showing that the brightness value of this pixel is the upper limit value of the dynamic range, and information showing the image pickup time of this pixel are added. In the corresponding pixel recorded to the recording unit, the pixel providing the image pickup time passing a predetermined time or more is most preferentially updated to the object pixel newly picked up. When no image pickup time of the corresponding pixel recorded to the recording unit has passed by the predetermined time, and the brightness value of the object pixel newly picked up is smaller than the upper limit value of the dynamic range, and the brightness value of the corresponding pixel recorded to the recording unit is greater than the upper limit value of the dynamic range, the corresponding pixel is updated to the object pixel. When the brightness value of the object pixel newly picked up is smaller than the upper limit value of the dynamic range, and the brightness value of the corresponding pixel recorded to the recording unit is smaller than the upper limit value of the dynamic range, and the exposure time of the object pixel newly picked up is longer than the exposure time of the corresponding pixel recorded to the recording unit, the corresponding pixel is updated to the object pixel. Thus, while a bad influence on the quality of the pickup image is most preferentially restrained, the image of a wide dynamic range and a high S/N can be generated. Therefore, for example, a frame memory indispensable to the image processor can be used as a delay element differently from a method in which a first image is picked up for a standard exposure time, and a second image is then picked up for a short exposure time shorter than the standard exposure time, and the image data of the first image are delayed by the delay element and are outputted simultaneously with the image data of the second image, and the image data of the pixel within the second image are selected instead of the image data of the pixel providing the upper limit value of the dynamic range with respect to the brightness value within this first image simultaneously outputted so that the image of a wide dynamic range is generated. As its result, manufacture cost can be reduced. Further, a synthesizing processor for enlarging the dynamic range can be realized without depending on the construction from the image pickup unit.

On the other hand, to solve the above problems, another image pickup device of the invention comprises a photoelectric converting section having plural photoelectric converting elements for converting exposed light into electric charges and accumulating the electric charges and arranged in a matrix shape; an electric shutter function able to change an exposure time every line of pixels constituting the photoelectric converting element in the photoelectric converting section; an image pickup unit for sequentially performing reset each of the photoelectric converting elements and exposure and reading of the electric charges out of each of the photoelectric converting elements every line different in the exposure time; and N-output channels (N is a natural number of 2 or more) respectively corresponding to N-kinds of exposure times and recording and outputting image data corresponding to the electric charges in each of the lines read out for every kind.

The image pickup device further comprises an attribute information adding unit for adding attribute information including an image pickup condition of the pixel to data of each pixel constituting the image data of the pickup image picked up by the image pickup unit; a recording unit for recording the image data of the pickup image to which the attribute information is added a selecting condition judging unit for judging, for each pixel, whether or not the attribute information added to the data of each pixel satisfies a preset selecting condition of the pixel on the basis of the attribute information added to the image data of each line sequentially outputted in a predetermined order from the N-output channels for every kind of the exposure time, and the attribute information added to the image data of the line corresponding to the image data of the each line recorded to the recording unit; and a pickup image generating unit for selecting the data of the pixel corresponding to the attribute information judged to satisfy the selecting condition, and recording the data of the selected pixel to the recording unit, and updating or maintaining the image data of the pickup image recorded to the recording unit for each pixel.

Further, the attribute information added to the data of the each pixel may include at least one of information showing the exposure time of the pixel, information showing that a brightness value of the pixel is an upper limit value of a dynamic range, and information showing an image pickup time of the pixel.

Further, the selecting condition judging unit may judge at least one of whether or not the exposure time of the data of an object pixel in the image data outputted from the output channel is longer than the exposure time of the data of the corresponding pixel in the image data recorded to the recording unit on the basis of the attribute information added to the data of the each pixel; whether or not the brightness value of the data of the object pixel in the image data outputted from the output channel is greater than the upper limit value of the dynamic range and the brightness value of the data of the corresponding pixel in the image data recorded to the recording unit is smaller than the upper limit value of the dynamic range; and whether or not the image pickup time of the data of the object pixel in the image data outputted from the output channel is separated from the image pickup time of the data of the corresponding pixel in the image data recorded to the recording unit by a predetermined time or more.

Further, the selecting condition judging unit may sequentially execute from a higher preferential order as processings for judging whether the selecting condition of the pixel is satisfied or not, first judgment processing of a first preferential order for judging whether or not the image pickup time of the data of an object pixel in the image data outputted from the output channel is separated from the image pickup time of the data of the corresponding pixel of the image data recorded to the recording unit by a predetermined time or more on the basis of the attribute information added to the data of each pixel; second judgment processing of a second preferential order for judging whether or not the brightness value of the data of the object pixel in the image data outputted from the output channel is smaller than the upper limit value of the dynamic range and the brightness value of the data of the corresponding pixel in the image data recorded to the recording unit is greater than the upper limit value of the dynamic range; and third judgment processing of a third preferential order for judging whether or not the exposure time of the data of the object pixel in the image data outputted from the output channel is longer than the exposure time of the data of the corresponding pixel in the image data recorded to the recording unit when the brightness value of the data of the object pixel in the image data outputted from the output channel is smaller than the upper limit value of the dynamic range and the brightness value of the data of the corresponding pixel of the image data recorded to the recording unit is smaller than the upper limit value of the dynamic range; and the judgment processings may be terminated when the selecting condition is satisfied in one of the first to third judgment processings.

Further, in the output channel for first outputting the image data within the image data in each of the lines sequentially outputted in a predetermined order for every kind of the exposure time from the N-output channels, the pickup image generating unit may change information showing the image pickup time added to the data of a pixel not updated in record by the pickup image generating unit into information showing the image pickup time passing a predetermined time within the data of the pixel constituting the image data recorded to the recording unit on a line corresponding to the line of the image data outputted from each output channel, in the remaining N−1 output channels not updated in record by the pickup image generating unit and outputting the image data next or later, within the data of the pixel constituting the image data recorded to the recording unit on the line corresponding to the line of the image data outputted from the output channel; and, in the N-output channels, the pickup image generating unit resets to a predetermined value, information showing the image pickup time added to the data of the pixel updated in record by the pickup image generating unit within the data of the pixel constituting the image data recorded to the recording unit on the line corresponding to the line of the image data outputted from each output channel.

In accordance with such constructions, for example, when, as the attribute information of each pixel of the picked-up image, information showing whether the brightness value of each pixel is a maximum value of the dynamic range or not is added, there is a case in which the brightness value of data of the object pixel of an image precedently outputted from one output channel among images picked up for two kinds of exposure times in the period of one frame is smaller than the upper limit value of the dynamic range, and the brightness value of data of the object pixel of an image outputted from the other output channel after the one output channel among the two kinds of exposure times is the upper limit value of the dynamic range. Namely, there is a case in which the pixel being in the saturated state for one exposure time no longer attains the saturated state for the other exposure time. In this case, when it is supposed that the brightness value of the data of the corresponding pixel already recorded shows the saturated state, the data of the object pixel corresponding to the other exposure time are recorded to the recording unit instead of the recorded pixel. Thus, the unsaturated image, i.e., the image of a wide dynamic range can be generated.

Further, as the attribute information of data of each pixel of the picked-up image, information showing the exposure time of this pixel is added, and the image data always unsaturated and having a long exposure time are preferentially recorded so that the image of a high S/N can be generated.

Further, as the attribute information of data of each pixel of the picked-up image, information showing the exposure time of this pixel, information showing that the brightness value of this pixel is the upper limit value of the dynamic range, and information showing the image pickup time of this pixel are added. In the data of the corresponding pixel recorded to the recording unit, the data of the pixel showing the image pickup time passing the predetermined time or more are most preferentially updated to the data of the object pixel outputted from the output channel. When no image pickup time of the corresponding pixel recorded to the recording unit has passed the predetermined time, and the brightness value of the data of the object pixel outputted from the output channel is smaller than the upper limit value of the dynamic range, and the brightness value of the data of the corresponding pixel recorded to the recording unit is greater than the upper limit value of the dynamic range, the data of the corresponding pixel are updated to the data of the object pixel. When the brightness value of the data of the object pixel outputted from the output channel is smaller than the upper limit value of the dynamic range, and the brightness value of the data of the corresponding pixel recorded to the recording unit is smaller than the upper limit value of the dynamic range, and the exposure time of the data of the object pixel outputted from the output channel is longer than the exposure time of the data of the corresponding pixel recorded to the recording unit, the data of the corresponding pixel are updated to the data of the object pixel. Thus, while a bad influence on the quality of the pickup image is most preferentially restrained, the image of a wide dynamic range and a high S/N can be generated.

Further, as the attribute information of the data of each pixel of the picked-up image, information showing the image pickup time of this pixel is added. In the output channel for first outputting the image data in the N-output channels, information showing the image pickup time added to the data of the pixel not updated in record by the pickup image generating unit within the data of the pixel constituting the image data recorded to the recording unit on a line corresponding to the line of the image data outputted from each output channel in the remaining N−1 output channels not updated in record by the pickup image generating unit and outputting the image data next or later within the data of the pixel constituting the image data recorded to the recording unit on the line corresponding to the line of the image data outputted from the output channel is changed to information showing the image pickup time passing the predetermined time. In the N-output channels, information showing the image pickup time added to the data of the pixel updated in record by the pickup image generating unit within the data of the pixel constituting the image data recorded to the recording unit on the line corresponding to the line of the image data outputted from each output channel is reset to a predetermined value (e.g., "0"). Thus, for example, the image pickup time can be updated in suitable timing when the images corresponding to the N-kinds of exposure times are picked up and these images are synthesized for each pixel so that one pickup image is generated.

As mentioned above, for example, after a first image is picked up for a standard exposure time, a second image is picked up for a short exposure time shorter than the standard exposure time. The image data of the first image are delayed by a delay element and are outputted simultaneously with the image data of the second image. Differing from the conventional method in which the image data of the pixel within the second image are selected instead of the image data of the pixel showing the upper limit value of the dynamic range with respect to the brightness value within this first image simultaneously outputted so that the image of a wide dynamic range is generated, a frame memory indispensable to the image processor can be used as the delay element. As its result, manufacture cost can be reduced. Further, a synthesizing processor for enlarging the dynamic range can be realized without depending on the construction from the image pickup unit.

BRIEF DESCRIPTION OF THE DRAWINGS

FIG. 1 is an explanatory view for explaining HDR-RAW data.

DETAILED DESCRIPTION OF THE PREFERRED EMBODIMENTS

Figure 2:
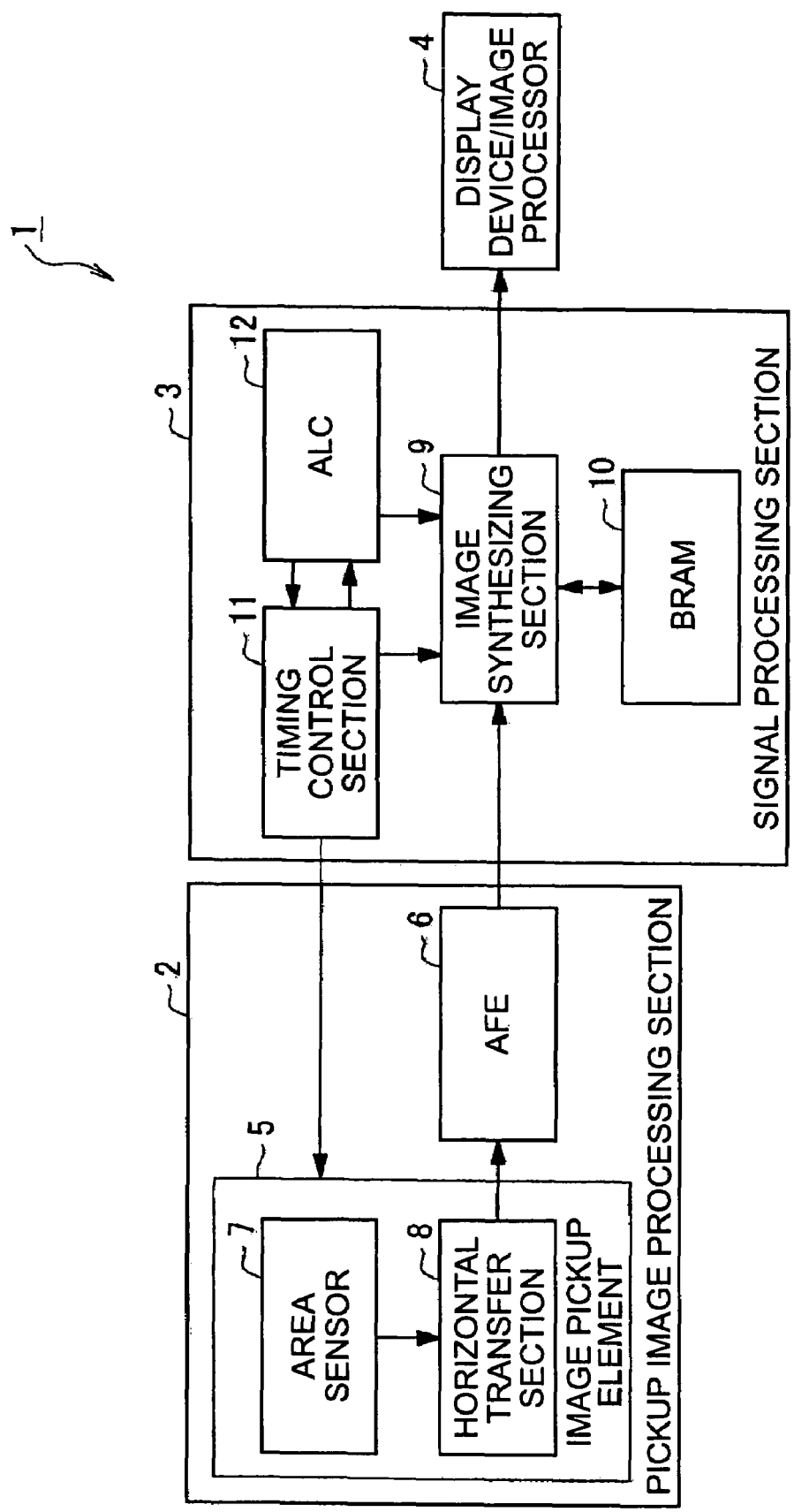
FIG. 2 is a block diagram showing the schematic construction of an image pickup device according to a principle of the present invention.

A first embodiment of an image pickup device according to the present invention will now be described with reference to the drawings.

The image pickup device 1 has an image pickup element having an electronic shutter function that is able to pick up images that use four kinds of exposure times (long exposure time>standard exposure time>short exposure time>super short exposure time) in one frame period. A photoelectrically converted pixel signal is sequentially outputted from the normal image pickup element for each pixel series. In this embodiment, the image pickup element that changes the exposure time for each pixel series (unit) is preferred. However, the invention can be adapted to use an image pickup element that changes the exposure time in a general frame unit. As shown in FIG. 1, the image pickup device 1 adds attribute data of image data (data showing a brightness value of the pixel) of each pixel of the image formed on the basis of the read pixel signal to the image data. The image pickup device 1 then generates one set of data (hereinafter also called "HDR-RAW data"). As attribute data, there are, for example, an exposure code that shows the exposure time at a generating time of the image data, a saturation flag that shows that the brightness value of the above image data is a maximum value of the time of the above image data, etc.

Here, the exposure code is four kinds (2 bits) of codes constructed by "0," "1," "2," and "3." The exposure code "0" shows that the exposure time at the generating time of the image data is the longest specific exposure time (long exposure time). The exposure code "1" shows an intermediate specific exposure time (standard exposure time) that is shorter than the exposure time shown by the exposure code "0." The exposure code "2" shows an intermediate specific exposure time (short exposure time) that is shorter than the exposure time shown by the exposure code "1." The exposure code "3" shows the shortest specific exposure time (super short exposure time).

The saturation flag is two kinds (1 bit) of data constructed by "0" and "1." The saturation flag "0" shows that the brightness value of the image data is a maximum value of the dynamic range. The saturation flag "1" shows that the above brightness value is smaller than the maximum value of the dynamic range.

Further, the making time code is four kinds (2 bits) of codes constructed by "0," "1," "2," and "3." The making time code "0" shows that the image data is generated by a newest frame. The making time code "1" shows that the image data is generated by a frame located before by one frame. The making time code "2" shows that the image data are generated by a frame located two frames before. The making time code "3" shows that the image data is generated by a frame located three frames before.

The image pickup device 1 has a BRAM (Brain Random Access Memory) for simultaneously recording the HDR-RAW data, i.e., the image data and the attribute data. This BRAM realizes a mechanism formed by imitating an operation of the brain of a human being. The BRAM records (updates) the image data of each pixel of the unsaturated image of a high S/N every time one frame period has passed. Namely, the image pickup device 1 reads-out the HDR-RAW data including an image data group showing the above pixel series from an HDR-RAW data group recorded to the BRAM. Further, the image pickup device 1 compares the above generated HDR-RAW data and the above read-out HDR-RAW data for every pixel. The image pickup device 1 then records the above generated HDR-RAW data to the BRAM instead of the above read-out HDR-RAW data on the basis of this comparing result. The image pickup device 1 then outputs the image data recorded to this BRAM to a display device/image processor.

FIG. 2 is a block diagram showing the internal construction of a first embodiment of the present invention. As shown in FIG. 2, the image pickup device 1 is constructed by including a pickup image processing section 2, a signal processing section 3 and a display device/image processor 4.

The pickup image processing section 2 is constructed by including an image pickup element 5 and an AFE (Analog Front End) 6.

The image pickup element 5 converges light from a photographed body to an area sensor 7 by an unillustrated image pickup lens, and accumulates electric charges according to the converged light to each pixel of the area sensor 7. Further, the image pickup element 5 sequentially converts an electric charge group accumulated in each pixel series of the area sensor 7 into a voltage group on the basis of a driving signal (a horizontal synchronous signal and a vertical synchronous signal) outputted from a timing control section 11 (described later) of the signal processing section 3. The image pickup element 5 then sequentially outputs the converted voltage group to the AFE 6 by a horizontal transfer section 8.

The AFE 6 converts the voltage outputted from the horizontal transfer section 8 into digitized image data (hereinafter also called "digital image data"). The AFE 6 then outputs the generated digital image data to an image synthesizing section 9 of the signal processing section 3.

The signal processing section 3 is constructed by including the image synthesizing section 9, the BRAM 10, the timing control section 11 and an ALC (Automatic Level Control) 12.

The timing control section 11 generates the driving signal (the horizontal synchronous signal and the vertical synchronous signal), and outputs the driving signal to the image pickup element 5. The timing control section 11 knows a pixel position (a pixel series (line) number and a pixel number) in the image pickup element with respect to the pixel signal outputted from the image pickup element 5 from the horizontal synchronous signal and the vertical synchronous signal. Accordingly, the timing control section 11 generates the pixel series (line) number (hereinafter also called "address information"). The timing control section 11 then outputs the address information to the ALC 12 and the image synthesizing section 9 (an HDR-RAW generator 14 (described later) (a BRAM data accumulating section 19 (described later))). Further, the timing control section 11 operates the image pickup element to obtain the pixel signal of a predetermined exposure time on the basis of the exposure time outputted from the ALC 12. This control may be an exposure control on a line basis and may also be a control in a frame unit.

The ALC 12 performs the exposure control of the image pickup element 5. Namely, the ALC 12 evaluates the digital image data outputted from the image synthesizing section 9 described later (a preprocess 13 (described later)) in the line unit or the frame unit. The ALC 12 then calculates the exposure time in the line unit or the frame unit on the basis of this evaluation result, and stores this exposure time to an unillustrated memory unit within the ALC. Further, the ALC 12 reads-out the exposure time of a corresponding address (pixel series) from the memory unit on the basis of the address information outputted from the timing control section 11. The ALC 12 then outputs this exposure time to the timing control section 11 and the image synthesizing section 9 (the HDR-RAW generator 14 (an HDR-RAW input data generating section 17 (described later)) (the exposure control on the line basis is supposed in this embodiment mode).

Figure 3:
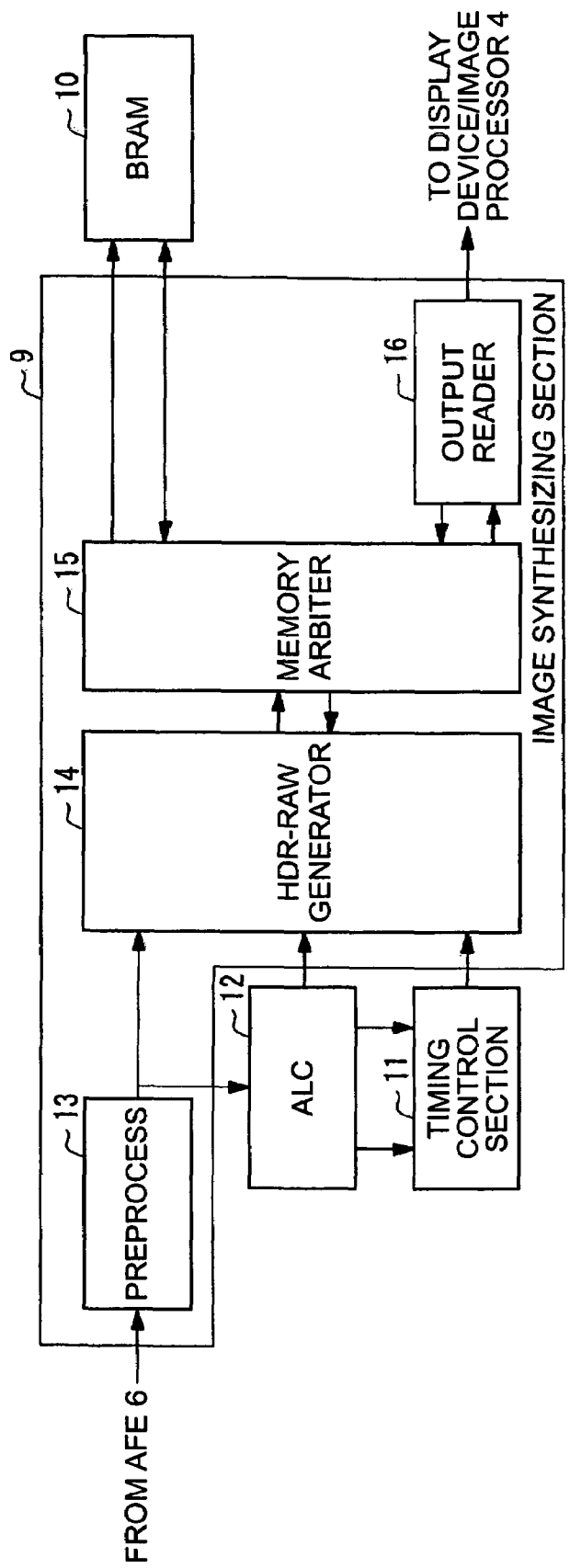
FIG. 3 is a block diagram showing the internal construction of an image synthesizing section of FIG. 2.

As shown in FIG. 3, the image synthesizing section 9 is constructed by including the preprocess 13, the HDR-RAW generator 14, a memory arbiter 15 and an output reader 16.

The preprocess 13 corrects the digital image data outputted from the AFE 6 to a black level. The preprocess 13 then outputs the corrected digital image data to the ALC 12 and the HDR-RAW generator 14 (the HDR-RAW input data generating section 17 (described later)). Further, the preprocess 13 judges whether the brightness value of the digital image data is a maximum value of the dynamic range or not (saturation/unsaturation). The preprocess 13 then outputs its result (saturation flag) to the HDR-RAW generator 14 (the HDR-RAW input data generating section 17). When the digital image data is saturated, the preprocess 13 outputs "1" as a saturation flag. In contrast to this, when the digital image data is unsaturated, the preprocess 13 outputs "0" as the saturation flag.

Figure 4:
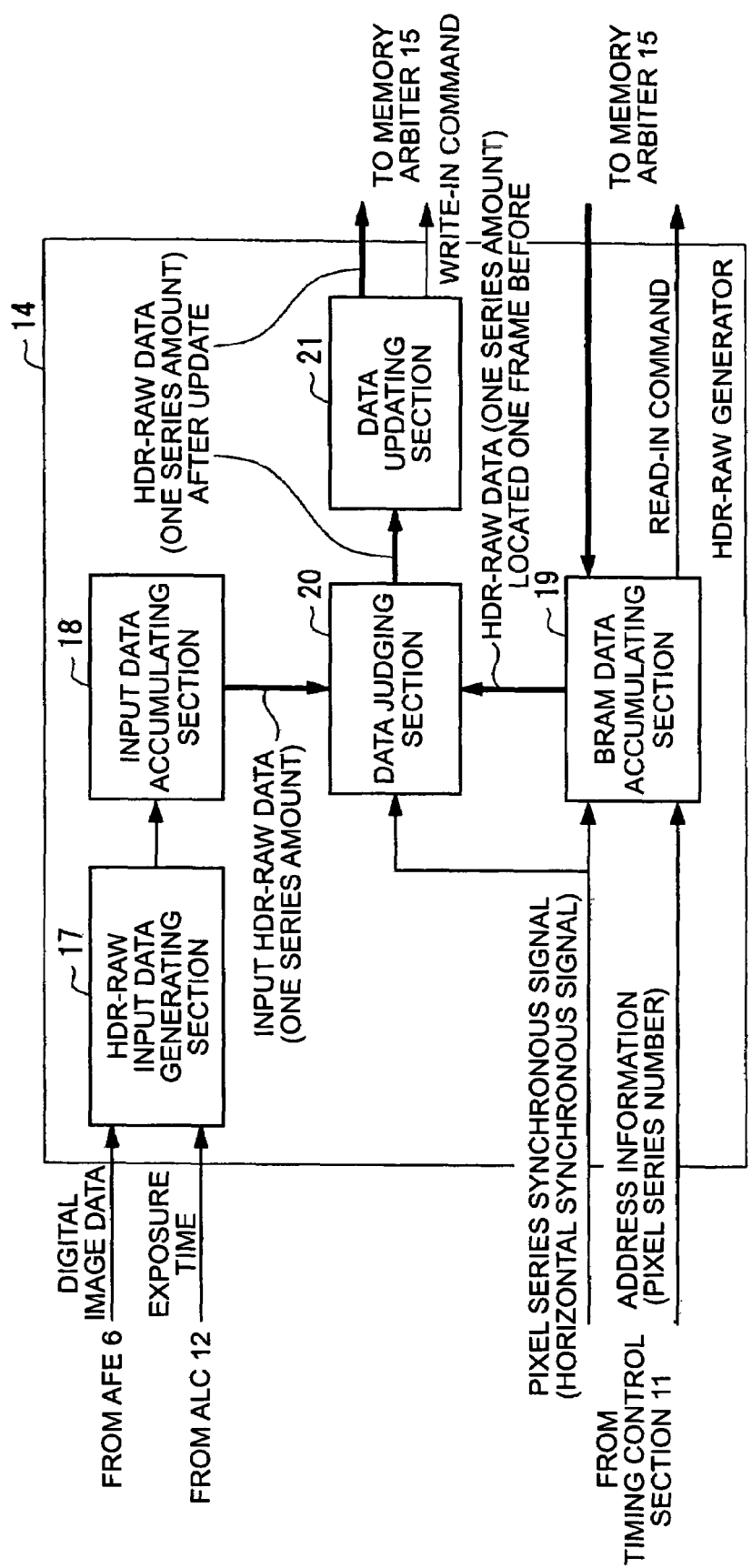
FIG. 4 is a block diagram showing the internal construction of an HDR-RAW generator of FIG. 3.
Figure 5:
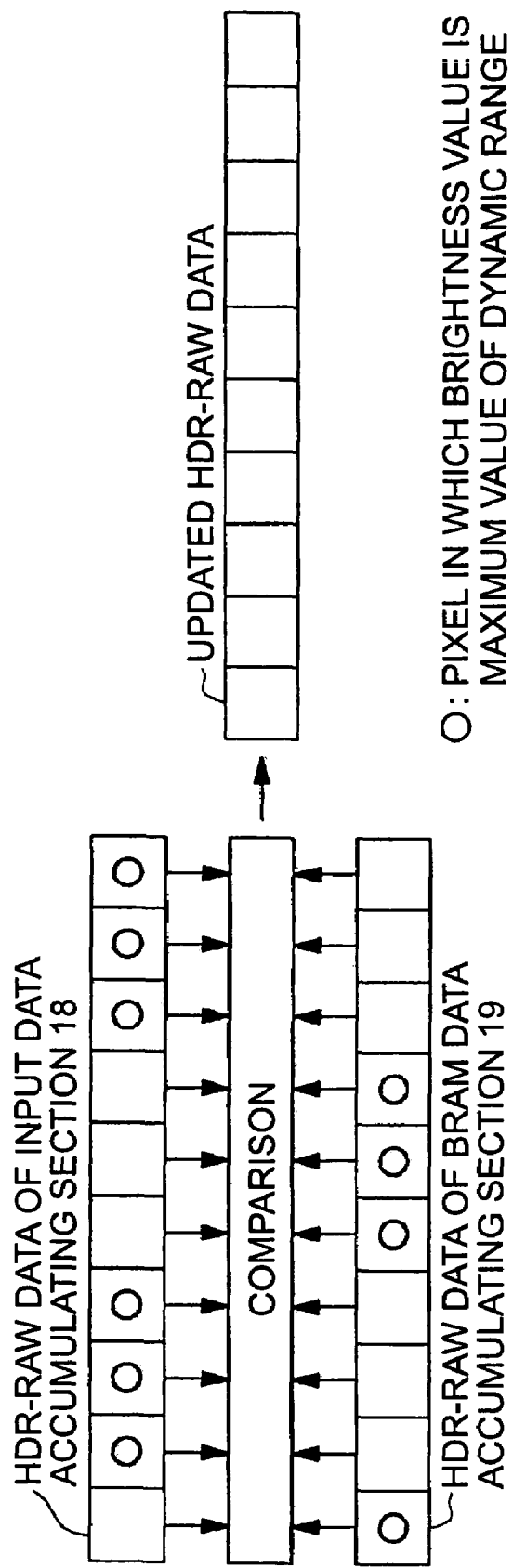
FIG. 5 is an explanatory view for explaining the operation of a data judging section of FIG. 3.

As shown in FIG. 4, the HDR-RAW generator 14 is constructed by including the HDR-RAW input data generating section 17, an input data accumulating section 18, a BRAM data accumulating section 19, a data judging section 20 and a data updating section 21.

The HDR-RAW input data generating section 17 adds attribute data (an exposure code, a saturation flag and a making time code) of the digital image data outputted from the preprocess 13 to the digital image data, and generates HDR-RAW data. Concretely, first, the addition of the exposure code (2-bit code) will be explained. The HDR-RAW input data generating section 17 receives information preprocess 13 from the ALC 12. When this exposure time is a long exposure time, "0" is added to the image data as the exposure code. When the above exposure time is a standard exposure time, "1" is added to the image data as the exposure code. When the above exposure time is a short exposure time, "2" is added to the image data as the exposure code. When the above exposure time is a super short exposure time, "3" is added to the image data as the exposure code.

The HDR-RAW input data generating section 17 also adds the saturation flag from the preprocess 13 to the image data.

Further, the HDR-RAW input data generating section 17 adds "0" (a code showing that the image data is generated in a new frame) to the image data as the making time code.

Further, the HDR-RAW input data generating section 17 outputs the digital image data to which the attribute data is added, i.e., the HDR-RAW data to the input data accumulating section 18.

Further, the input data accumulating section 18 accumulates the HDR-RAW data outputted from the HDR-RAW input data generating section 17 by one pixel series of the area sensor 7.

Further, a command (hereinafter also called "a read-out command") for reading the HDR-RAW data of the pixel series (pixel series corresponding to the digital image data outputted from the preprocess 13) shown by the address information outputted from the timing control section 11 out of the BRAM 10 is outputted to the memory arbiter 15 by the BRAM data accumulating section 19. The BRAM data accumulating section 19 accumulates the HDR-RAW data read-out by this read-out command by one pixel series. The HDR-RAW data accumulated in the BRAM data accumulating section 19 become data of the same pixel series number as the data accumulated in the input data accumulating section 18.

The data judging section 20 respectively compares the HDR-RAW data of the same pixel position in the HDR-RAW input data accumulated in the input data accumulating section 18, and the HDR-RAW input data accumulated in the BRAM data accumulating section 19. On the basis of its comparison result, the data judging section 20 updates the HDR-RAW data recorded to the BRAM 10. Concretely, the data judging section 20 respectively compares the attribute data of the HDR-RAW data of the above same pixel position by the processing of "preferential orders 1, 2, 3" shown below. On the basis of its comparison result, the data judging section 20 judges whether it is necessary to update the HDR-RAW data by using the HDR-RAW data of the input data accumulating section 18 or not. With respect to the HDR-RAW data judged such that it is not necessary to update the HDR-RAW data, the data judging section 20 selects the data of the BRAM data accumulating section 19. In contrast to this, with respect to the HDR-RAW data judged that it is necessary to update the HDR-RAW data, the data judging section 20 selects the data of the input data accumulating section 18. The data judging section 20 then synthesizes the data so that the HDR-RAW data of one pixel series is newly generated (updated). The attribute data is also updated at the updating time of the HDR-RAW data. Concretely, when the HDR-RAW data accumulated in the input data accumulating section 18 is used, the making time code is set to "0." When the HDR-RAW data accumulated in the BRAM data accumulating section 19 is used, the numerical value of the making time code is incremented by one. With respect to the exposure code and the saturation flag, the exposure code and the saturation flag of the selected HDR-RAW data are selected (updated).

Preferential Order 1

It is judged whether or not a making update time code of the HDR-RAW data accumulated in the BRAM data accumulating section 19 is "2" or "3" (a code showing time located before by a two-frame period or more). In the case of "2" or "3," it is judged that it is necessary to update the HDR-RAW data, and no processing of "preferential orders 2, 3" is performed.

Preferential Order 2

It is judged whether or not the saturation flag of the HDR-RAW data accumulated in the BRAM data accumulating section 19 is "1" (a flag showing that the brightness value is a maximum value of the dynamic range), and the saturation flag of the HDR-RAW data accumulated in the input data accumulating section 18 is "0" (a flag showing that the brightness value is smaller than the maximum value of the dynamic range). When the former is "1" and the latter is "0," it is judged that it is necessary to update the HDR-RAW data. Conversely, when the former is "0" and the latter is "1," it is judged that no HDR-RAW data are updated. No processing of "preferential order 3" is then performed.

Preferential Order 3

When the saturation flag of the HDR-RAW data of the BRAM data accumulating section 19 is "0" and that (the saturation flag) of the input data accumulating section 18 is "0," the exposure code of the HDR-RAW data of the BRAM data accumulating section 19 and the exposure code of the HDR-RAW data of the input data accumulating section 18 are compared. When the exposure time of the input data accumulating section 18 is long, it is judged that it is necessary to update the HDR-RAW data. Since the HDR-RAW data can be updated to image data generated for a longer exposure time by this processing, the image of a high S/N can be generated. When the saturation flag of the HDR-RAW data of the BRAM data accumulating section 19 is "1" and that (the saturation flag) of the input data accumulating section 18 is "1," the exposure code of the HDR-RAW data of the BRAM data accumulating section 19 and the exposure code of the HDR-RAW data of the input data accumulating section 18 are compared. When the exposure time of the input data accumulating section 18 is short, it becomes necessary to update the HDR-RAW data (since the pixel data is a maximum value, they become the same value, but the exposure code is updated).

The data updating section 21 accumulates the HDR-RAW data of one pixel series generated (updated) in the data judging section 20. The data updating section 21 then outputs a command (hereinafter also called "a write-in command") for writing these accumulated HDR-RAW data into the BRAM 10 to the memory arbiter 15.

Further, when a read-out command is outputted from one of the HDR-RAW generator 14 (the BRAM data accumulating section 19 and the data updating section 21) and the output reader 16, the memory arbiter 15 reads the HDR-RAW shown by this outputted read-out command out of the BRAM 10, and outputs these HDR-RAW data to an output source of the read-out command. Further, when the write-in command is outputted from the HDR-RAW generator 14 (data updating section 21), the memory arbiter 15 writes the HDR-RAW data shown by this outputted write-in command into the BRAM 10.

The output reader 16 outputs the read-out command synchronized with a synchronous signal of an image signal to the display device/image processor 4 to the memory arbiter 15 (in non-synchronization with the driving signal of the image pickup element 5). The HDR-RAW data read out by the memory arbiter 15 on the basis of the above read-out command is accumulated in the output reader 16 (not shown in the drawings). The accumulated HDR-RAW data is converted into a format able to be understood by the display device/image processor 4, and is synchronously outputted to the exterior. When the image data of this format is inputted, the display device/image processor 4 performs processing according to the device (e.g., display processing, image recognition processing, etc.).

Further, when there is a read-out request from the memory arbiter 15, the HDR-RAW data shown by this request is read out of the BRAM 10. When there is a write-in request from the memory arbiter 15, the HDR-RAW shown by this write-in request is written into the BRAM 10.

<Operation of Image Pickup Device>

Next, the operation of the image pickup device of the present invention will be explained in detail.

Here, the image pickup device for changing the exposure time in a pixel series (line) unit is used. The following explanation can be also adapted to an image pickup device for changing the exposure time in the frame unit.

Now, an image pickup operation is executed in some frames so that an ALC operation is converged and the exposure time is calculated for every pixel series. Then, an electric charge group of an image picked up for the standard exposure time is converted into a voltage group by the area sensor 7 of the image pickup element 5 in an N-th line. Thus, as shown in FIG. 2, the voltage group converted in the pixel series shown by the driving signal outputted from the timing control section 11 of the signal processing section 3 is read out by the horizontal transfer section 8. This read-out voltage group is outputted to the AFE 6 by the horizontal transfer section 8. Further, digital image data is generated by the AFE 6 on the basis of this outputted voltage group. The generated digital image data is outputted to the image synthesizing section 9 (preprocess 13) of the signal processing section 3. Further, as shown in FIG. 3, the outputted digital image data is corrected to a black level by the preprocess 13. The digital image data corrected to the black level is outputted to the ALC 12 and the HDR-RAW generator 14 (the HDR-RAW input data generating section 17). The preprocess 13 judges unsaturation/saturation of the digital image data, and outputs its result (saturation flag) to the HDR-RAW generator 14 (the HDR-RAW input data generating section 17) (outputs the saturation flag "1" to the digital image data of a pixel having a brightness value equal to a maximum value of the dynamic range). The ALC 12 outputs the exposure time of the digital image data inputted at present on the basis of address information outputted from the timing control section 11, and also outputs this exposure time to the HDR-RAW generator 14 (the HDR-RAW input data generating section 17) of the image synthesizing section 9 and the timing control section 11. Thus, attribute data of the digital image data is added to the digital image data by the HDR-RAW input data generating section 17 so that the HDR-RAW data is generated. At this time, the saturation flag, the making time data and the exposure code are added as the attribute data. The exposure code is calculated from the exposure time. The generated HDR-RAW data is then outputted to the input data accumulating section 18 by the HDR-RAW input data generating section 17. The generated HDR-RAW data is then accumulated by one pixel series by the input data accumulating section 18. The read-out command is outputted to the memory arbiter 15 by the BRAM data accumulating section 19 in parallel with this input data accumulating operation. At this time, the address information of the pixel series corresponding to the digital image data inputted at present, and a control signal synchronized with the horizontal synchronous signal are inputted from the timing control section 11 to the BRAM data accumulating section 19. The read-out command based on this address information and the control signal is outputted to the memory arbiter. The memory arbiter reads the HDR-RAW data out of the BRAM 10 on the basis of the above read-out command. The read-out HDR-RAW data is accumulated by one pixel series by the BRAM data accumulating section 19.

Here, for brevity of explanation, each pixel series is constituted by ten pixels. With respect to the HDR-RAW data accumulated in the input data accumulating section 18, the saturation flag of the attribute data is "1" in first and fifth to seventh pixels from the left-hand end side seen from a plane of the pixel series. With respect to the HDR-RAW data accumulated in the BRAM data accumulating section 19, the saturation flag is "1" in second to fourth and eighth to tenth pixels from the left-hand end side seen from the plane of the pixel series. Further, all the making time data of the HDR-RAW data accumulated in the BRAM data accumulating section 19 is "1." Further, the exposure codes of all the HDR-RAW data accumulated in the input data accumulating section 18 is "1," and the exposure codes of all the HDR-RAW data accumulated in the BRAM data accumulating section 19 is "1" so that both of the values are equal. On the basis of the attribute data, the data judging section 20 compares and judges the HDR-RAW input data accumulated in the input data accumulating section 18 and the HDR-RAW input data accumulated in the BRAM data accumulating section 19. At this time, the HDR-RAW data of the same pixel position is compared, and it is judged from its comparison result that it is necessary to update the HDR-RAW data of second to fourth and eighth to tenth pixels from the left-hand end side seen from the plane. Further, on the basis of its judging result, with respect to the HDR-RAW data of first and fourth to seventh pixels from the left-hand end side seen from the plane, the data judging section 20 selects the HDR-RAW data of the BRAM data accumulating section 19. With respect to the HDR-RAW data of the second to fourth and the eighth to tenth pixels from the left-hand end side seen from the plane, the data judging section 20 selects the HDR-RAW data of the input data accumulating section 18. The HDR-RAW data of one pixel series is updated by synthesizing the selected HDR-RAW data. The write-in command is outputted to the memory arbiter 15 by the data updating section 21. The updated HDR-RAW data is written into the BRAM 10 by the memory arbiter 15. At this time, the writing-in operation is performed in the area of a corresponding pixel series (address information) of the BRAM 10.

The above flow is also repeated in the pixel series of other rows.

Next, an output method to an external device (display device/image processor 4) of the HDR-RAW data stored to the BRAM will be described. The output reader 16 outputs the read-out command to the memory arbiter 15 in non-synchronization with the above synthesizing operation, i.e., in synchronization with a synchronous signal of the display device/image processor 4. The memory arbiter 15 reads the HDR-RAW data out of the BRAM 10 on the basis of the read-out command for an external output, and the read-out HDR-RAW data is outputted to the output reader 16. The output reader 16 converts the HDR-RAW data into a format able to be understood by the display device/image processor 4, and outputs the HDR-RAW data to the exterior. In this embodiment, a special format is used as the image data format. Namely, it is set to the image data format consisting of the digital image data and the exposure code (pixel unit). When the image data of the above format is inputted to the display device/image processor 4, the display device/image processor 4 reconstructs the image signal from the digital image data and the exposure code and performs display and image processing.

Thus, in the image pickup device of this embodiment, when the saturation flag of the HDR-RAW data accumulated in the BRAM data accumulating section 19 is "1" and the saturation flag of the HDR-RAW data accumulated in the input data accumulating section 18 is "0," i.e., when a pixel in a saturated state no longer attains the saturated state, the HDR-RAW data accumulated in the input data accumulating section 18 is recorded to the BRAM 10 instead of the HDR-RAW data recorded so far. Thus, the image data of the image of a wide dynamic range can be generated.

Further, in accordance with this embodiment, a frame memory required to be synchronized with the operation of the display device/image processor can be used together with a buffer for delay. Therefore, for example, after a first image is picked up, a second image is picked up. The image data of the first image are delayed by a delay element, and the image data of the first image is outputted simultaneously with the image data of the second image. The image data of a pixel within the second image is recorded instead of the image data of a pixel in which the brightness value within this delayed first image becomes a maximum value of the dynamic range. Thus, unlike a method for generating the image data of the image of the wide dynamic range, it is not necessary to arrange the delay element so that manufacture cost can be reduced by the amount for arranging the delay element.

Further, the synthesis in the pixel unit can be simply realized by the image data format of the invention and its construction. Namely, attribute data (the exposure code, the saturation flag and the making time code) are added to each pixel data constituting the image, and the synthesis is performed by using the added attribute data. Therefore, since the saturation state, the exposure time and the making time are known by the attribute data, the synthesis can be easily made by utilizing the attribute data. An unsaturated image of a high S/N can be generated by this synthesizing method. The frame memory of large capacity (BRAM 10) required in the synthesis can be cheaply obtained. Accordingly, addition of the attribute data will not cause a large defect.

As mentioned above, in the above first embodiment, the HDR-RAW input data generating section 17 of FIG. 4 constitutes an attribute information adding unit. Hereinafter, the input data accumulating section 18, the BRAM data accumulating section 19, the data judging section 20 and the data updating section 21 of FIG. 4 similarly constitute a pickup image generating unit. The data judging section 20 of FIG. 4 constitutes a selecting condition judging unit. The data judging section 20 and the data updating section 21 of FIG. 4 constitute a selecting pixel synthesizing unit. The BRAM 10 of FIGS. 2 and 3 constitutes a recording unit.

Second Embodiment

A second embodiment of the image pickup device of the invention will now be explained with reference to the drawings.

The above first embodiment mode shows an example using the pickup image processing section 2 (sensor) having only one output channel for outputting the analog image data to the AFE 6. However, the image pickup device in this embodiment mode uses a sensor having two output channels or more, and simultaneously outputs the analog image data (pixel signal data) corresponding to several kinds of exposure times (from separate pixel series) in non-synchronization in a plurality of channels. The analog image data corresponding to the several kinds of exposure times outputted from this sensor are converted into image data digitized by the AFE. The digitized image data and image data recorded to the BRAM that corresponds to the image data are synthesized for each pixel by the image synthesizing section so that the pickup image is generated. Further, similar to the above first embodiment, the attribute data of the digital image data (data showing the brightness value of a pixel) of each pixel of the image formed on the basis of a pixel signal read out of the area sensor of the pickup image processing section is added to the image data so that one set of data (hereinafter also called "HDR-RAW data") is generated. Similar to the above first embodiment, the attribute data includes the exposure code showing the exposure time at the generating time of the image data, the saturation flag showing that the brightness value of the image data is a maximum value of the dynamic range, the making time code showing a time when the image data is generated, etc. These codes, etc. are set to use constructions similar to those of the above first embodiment. The BRAM is also set to a construction similar to that of the above first embodiment.

The following explanation will be made with the image pickup device 1 of the above construction as an image pickup device 1'.

<Construction of Image Pickup Device>

The basic construction of the image pickup device 1' of this embodiment is the same as the image pickup device 1 shown in FIG. 2 of the above first embodiment. A first output channel and a second output channel for respectively separately reading and outputting pixel signals of images picked up for two kinds of different exposure times are added to the horizontal transfer section 8 of the image pickup element 5 in the pickup image processing section 2. The AFE 6 of the pickup image processing section 2 is set to a first AFE 6, and a second AFE 6' of the same construction as the first AFE 6 is further added to the image pickup processing section 2 respectively, corresponding to the two output channels. It is also constructed such that a function for separately outputting the above read image data of a pixel series unit from the above two output channels to the first and second AFEs 6 and 6' is added to the horizontal transfer section 8. Further, in the image pickup device 1', two kinds of digital image data different in the exposure time outputted from the first and second AFEs 6 and 6' are separately processed. Therefore, the preprocess 13 of the image synthesizing section 9 is set to a first preprocess 13. A second preprocess 13' of the same construction as the first preprocess 13 is further added to the image synthesizing section 9. Similarly, the HDR-RAW generator 14 of the image synthesizing section 9 is set to a first HDR-RAW generator 14. A second HDR-RAW generator 14' of the same construction as the first HDR-RAW generator 14 is further added to this image synthesizing section 9. With respect to constructional portions similar to those of the above first embodiment mode, the same reference numerals are designated, and their detailed explanations are omitted. In the following description, different portions will be explained in detail.

The pickup image processing section 2 in the image pickup device 1' is constructed by including the image pickup element 5, the first AFE (Analog Front End) 6 and the second AFE 6'.

The image pickup element 5 is constructed by including the area sensor 7 and the horizontal transfer section 8. The horizontal transfer section 8 is constructed by including the first output channel and the second output channel constructed by including an analog line memory. The image pickup element 5 sequentially converts an electric charge group accumulated in each pixel series of the area sensor 7 into a voltage group for each of two kinds of different exposure times on the basis of a driving signal (the horizontal synchronous signal and the vertical synchronous signal) outputted from the timing control section 11 of the signal processing section 3. The image pickup element 5 also respectively separately sequentially outputs this converted voltage group to the first and second AFEs 6 and 6' each of exposure times through the first output channel and the second output channel (these channels are physically different) of the horizontal transfer section 8. In this embodiment mode, the first output channel and the first AFE 6 are correspondingly set, and the second output channel and the second AFE 6' are correspondingly set.

Figure 6:
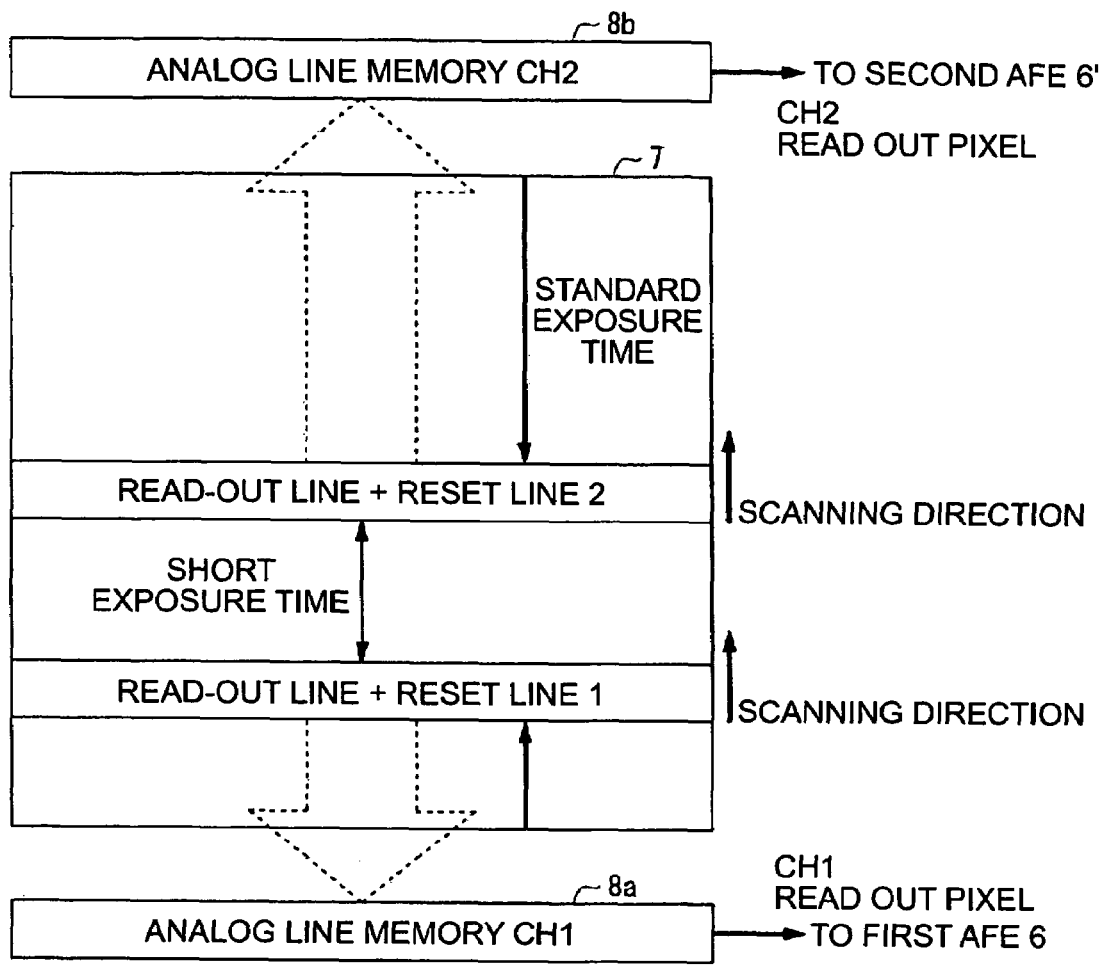
FIG. 6 is a view showing a reset of each pixel in an image pickup element 5, an exposure, a reading-out of a pixel signal, and an output operation to AFE.

A control method of the exposure time of the image pickup element 5 in the image pickup device 1' and the construction of reading-out of a pixel signal and an output to the AFE will next be explained on the basis of FIG. 6. Here, FIG. 6 is a view showing reset of each pixel in the image pickup element 5, exposure, reading-out of the pixel signal and an output operation to the AFE.

Here, the control of the exposure time of the invention is performed such that a plurality of reading-out/reset lines for reading-out the pixel signal and resetting each pixel in the pixel series unit are set for each exposure time with respect to the area sensor 7, and the reading-out of the pixel signal and the reset of the pixel in each reading-out/reset line are executed in timing according to each exposure time on the basis of the exposure time outputted from the ALC 12. For example, as shown in FIG. 6, a reading-out/reset line 1 is set with respect to the short exposure time outputted from the ALC 12, and a reading-out/reset line 2 is similarly set with respect to the standard exposure time outputted from the ALC 12. The timing of the reading-out of the pixel signals and the reset of the pixels in these reading-out/reset lines 1 and 2 is controlled as shown in FIG. 6. Namely, with respect to a pixel series in which the pixel signal is read out and the pixel is reset in the reading-out/reset line 2 corresponding to the standard exposure time, the pixel signal is read out and the pixel is reset in the reading-out/reset line 1 corresponding to the short exposure time after the short exposure time has passed. Further, with respect to a pixel series in which the pixel signal is read out and the pixel is reset in the reading-out/reset line 1, the pixel signal is read out and the pixel is reset in the reading-out/reset line 2 after the standard exposure time has passed. Namely, the reading-out of the pixel signal and the reset of the pixel in the reading-out/reset line 2 are precedently started in conformity with the passage of the standard exposure time. After this reset and the passage of the short exposure time, the reading-out of the pixel signal and the reset of the pixel in the reading-out/reset line 1 are started toward the same scanning direction from the pixel series of the same position as a starting position of the reading-out/reset line 2. With such timing, all areas of the area sensor 7 are scanned in parallel by the reading-out/reset lines 1 and 2, and the reading-out of the pixel signal and the reset are sequentially performed. Analog data of a pickup image with respect to two kinds of different exposure times is respectively read out.

Further, the pixel signal of the pixel series read out every each exposure time is recorded to each of analog line memories of the output channels (the first output channel and the second output channel) different in each of exposure times. On the basis of the driving signal (the horizontal synchronous signal and the vertical synchronous signal) outputted from the timing control section 11, this pixel signal is then outputted from each of these output channels to each of the AFEs (first and second AFEs 6 and 6') one-to-one corresponding to these output channels. In the example shown in FIG. 6, the analog data of the pixel signal of the short exposure time read out in the reading-out/reset line 1 are recorded to the analog line memory of the output channel 1. The analog data of the pixel signal of the standard exposure time read out in the reading-out/reset line 2 is recorded to the analog line memory of the output channel 2. The recorded analog data is outputted from the first output channel to the first AFE 6 and is also outputted from the second output channel to the second AFE 6' on the basis of the driving signals different in each of output channels. At this time, these data are respectively outputted from both the channels with a phase difference (time difference) between the standard exposure time and the short exposure time.

Figure 7:
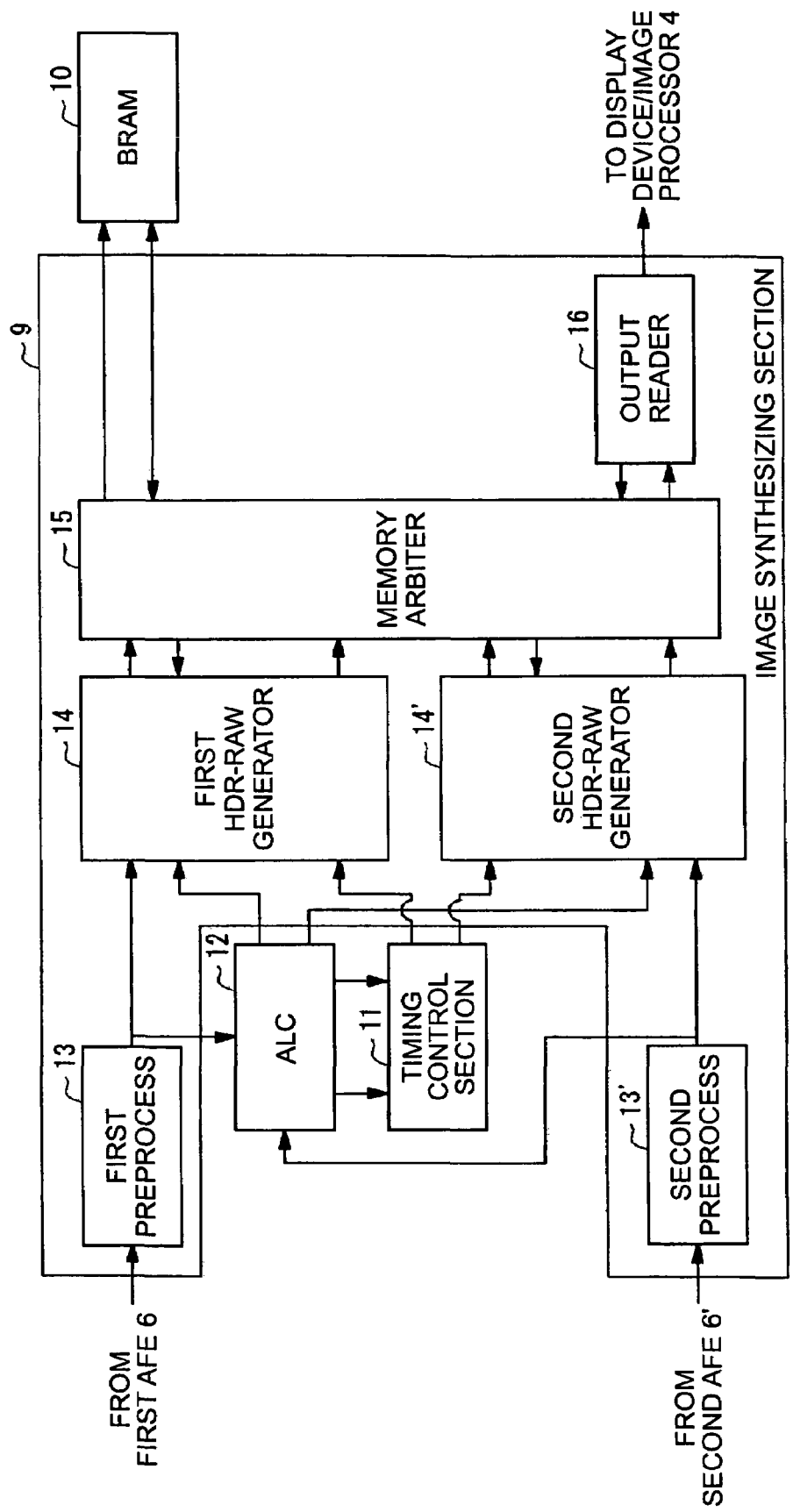
FIG. 7 is an explanatory view for explaining a modified example of the image synthesizing section.

The construction of a function section for performing the image synthesis of the image pickup device 1' will be further explained on the basis of FIG. 7. Here, FIG. 7 is a block diagram showing the construction of the image synthesizing function section in the image pickup device 1'.

The main function section for performing image construction processing is constructed by including an image constructing section 9, the BRAM 10, the timing control section 11 and the ALC 12.

The timing control section 11 in the image pickup device 1' outputs address information of each pixel series to the ALC 12 and the image synthesizing section 9 (a first HDR-RAW generator 14 and a second HDR-RAW generator 11') for each exposure time. The other functions are similar to those of the above first embodiment.

The ALC 12 in the image pickup device 1' reads out the exposure time of a corresponding address (pixel series) from a memory unit on the basis of the address information outputted from the timing control section 11, and outputs this exposure time to the timing control section 11 and the image synthesizing section 9 (the first HDR-RAW generator 14 and the second HDR-RAW generator 11'). The other functions are similar to those of the above first embodiment.

As shown in FIG. 7, the image synthesizing section 9 in the image pickup device 1' is constructed by including a first preprocess 13, a second preprocess 13', the first HDR-RAW generator 14, the second HDR-RAW generator 14', the memory arbiter 15 and the output reader 16.

The first preprocess 13 corrects digital image data outputted from a first AFE 6 to a black level. The second preprocess 13' corrects digital image data outputted from a second AFE 6' to a black level. The first preprocess 13 outputs the corrected digital image data to the ALC 12 and the first HDR-RAW generator 14 (a first HDR-RAW input data generating section 17 (described later)). The second preprocess 13' outputs the corrected digital image data to the ALC 12 and the second HDR-RAW generator 14' (a second HDR-RAW input data generating section 17' (described later)).

Further, the first preprocess 13 judges whether the brightness value of the digital image data is a maximum value of the dynamic range or not (saturation/unsaturation). The first preprocess 13 outputs its result (saturation flag) to the first HDR-RAW generator 14 (the first HDR-RAW input data generating section 17). The second preprocess 13' outputs the above saturation flag to the second HDR-RAW generator 14' (the second HDR-RAW input data generating section 17').

Further, similar to the above first embodiment, the first HDR-RAW generator 14 and the second HDR-RAW generator 14' add attribute data to two kinds of digital image data (respectively image data of one pixel series) of different exposure times, respectively, inputted from the first preprocess 13 and the second preprocess 13' with a phase difference. The first HDR-RAW generator 14 and the second HDR-RAW generator 14' then generate first HDR-RAW data and second HDR-RAW data corresponding to the digital image data of the respective exposure times. The generated first HDR-RAW data is accumulated in a first input data accumulating section 18. The generated second HDR-RAW data is accumulated in a second input data accumulating section 18'.

On the other hand, the HDR-RAW data of a pixel series corresponding to the image data precedently outputted from the first preprocess 13 and the second preprocess 13' are read out of the BRAM 10 and are stored to one of a first BRAM data accumulating section 19 and a second BRAM data accumulating section 19'. Concretely, for example, when the image data is precedently outputted from the second preprocess 13', the HDR-RAW data of the pixel series corresponding to the second HDR-RAW data is read out of the BRAM 10 and is accumulated in the second BRAM data accumulating section 19'. Hereinafter, the image data (the image data corresponding to the second output channel) is similarly precedently outputted from the second preprocess 13'. Thereafter, the image data (the image data corresponding to the first output channel) of the same pixel series number as these image data is set to be outputted from the first preprocess 13 with a predetermined phase difference. Accordingly, new data is successively outputted from the precedent second preprocess 13' (corresponding to the second output channel) until data is outputted from the first preprocess 13 (corresponding to the first output channel).

Further, a second data judging section 20' constituting the second HDR-RAW generator 14' compares the HDR-RAW data at the same pixel position in second HDR-RAW input data accumulated in the second input data accumulating section 18' and in HDR-RAW input data accumulated in the second BRAM data accumulating section 19'. The second data judging section 20' updates the HDR-RAW data recorded to the BRAM 10 on the basis of its comparison result. Concretely, similar to the above first embodiment, the attribute data of the HDR-RAW input data accumulated in the second input data accumulating section 18' and the HDR-RAW data located in the same pixel position as these HDR-RAW input data and accumulated in the second BRAM data accumulating section 19' are respectively compared by the processing of "preferential orders 1, 2, and 3." On the basis of its comparison result, it becomes necessary to judge the respective corresponding HDR-RAW data by using the second HDR-RAW data of the second input data accumulating section 18' or not. The second data judging section 20' selects the data of the second BRAM data accumulating section 19' with respect to the HDR-RAW data judged such that it is not necessary to update the HDR-RAW data. In contrast to this, with respect to the HDR-RAW data judged such that it is necessary to update the HDR-RAW data, the second data judging section 20' selects the data of the second input data accumulating section 18'. The HDR-RAW data of one pixel series is respectively newly generated (updated) by synthesizing the selected data. The attribute data is also updated at the updating time of the HDR-RAW data. Thus, the HDR-RAW data generated in this way is written into the BRAM 10 through a second data updating section 21' and the memory arbiter 15.

On the other hand, when the first HDR-RAW data delayingly inputted and corresponding to the short exposure time is accumulated in the first input data accumulating section 18, the first HDR-RAW generator 14 reads the HDR-RAW data (exactly, the HDR-RAW data of the same pixel series number as the first HDR-RAW data) update-processed by the second HDR-RAW data corresponding to the standard exposure time out of the BRAM 10, and accumulates the HDR-RAW data to the first BRAM data accumulating section 19. Similar to the above second data judging section 20', the first data judging section 20 respectively compares the HDR-RAW data at the same pixel position in the first HDR-RAW input data accumulated in the first input data accumulating section 18 and in the HDR-RAW input data accumulated in the first BRAM data accumulating section 19. On the basis of its comparison result, the first data judging section 20 updates the HDR-RAW data recorded to the BRAM 10.

Figure 8B:
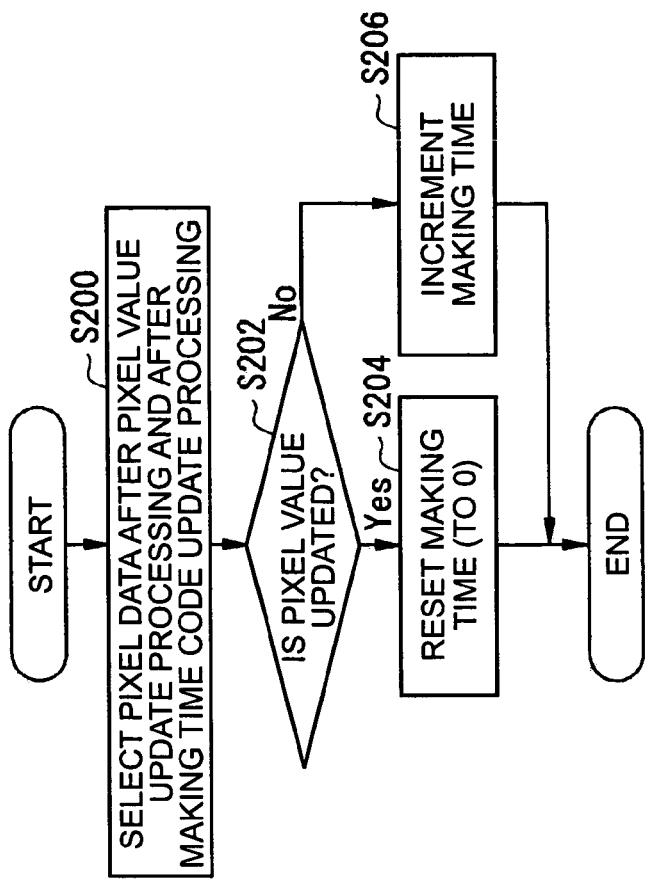
FIG. 8 is a flow chart showing update processing of a making time code.
Figure 8A:
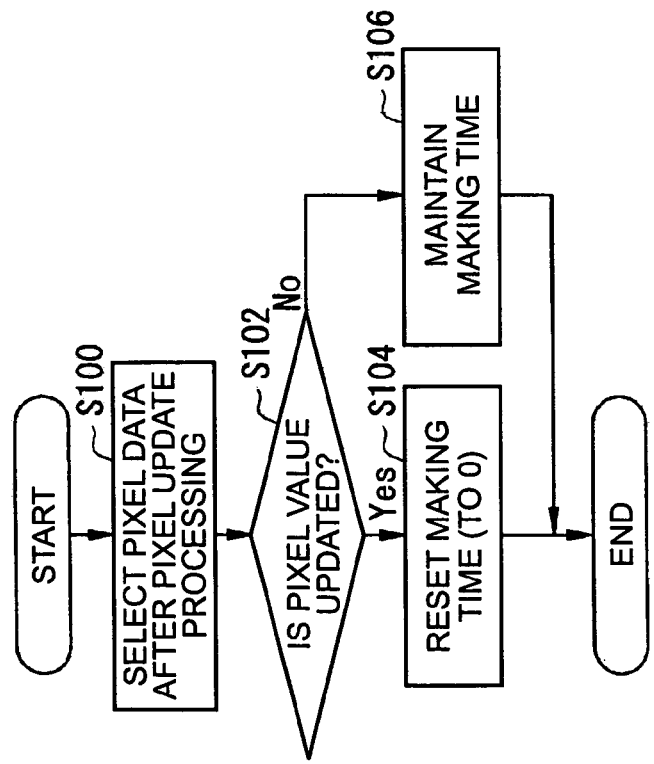

In the update processing of the attribute data in the first judging section 20 and the second judging section 20', concretely, similar to the above first embodiment, with respect to the exposure code and the saturation flag, those of the selected HDR-RAW data is selected (updated). On the other hand, with respect to the making time code, the separate update processings are respectively performed in the first judging section 20 and the second judging section 20' in accordance with the flow charts shown in FIGS. 8(*a*) and 8(*b*). Here, FIG. 8(*a*) is the flow chart showing the update processing of the making time code with respect to the update processing using the second HDR-RAW data (corresponding to the second output channel) precedently outputted. FIG. 8(*b*) is the flow chart showing the update processing of the making time code with respect to the update processing using the first HDR-RAW data (corresponding to the first output channel) outputted later.

First, the attribute data update processing in the second judging section 20' will be explained on the basis of FIG. 8(*a*).

As shown in FIG. 8(*a*), it first proceeds to a step S100, and pixel data after the update processing of a pixel value is selected, and it proceeds to a step S102.

In the step S102, it is judged whether or not the pixel data selected in the step S100 show a pixel updated with respect to the pixel value by the second HDR-RAW data. When it is judged that the pixel data is the updated pixel data (Yes), it proceeds to step S104. In contrast to this, when it is judged that no pixel data is the updated pixel data (No), it proceeds to step S108.

When it proceeds to step S104, the making time code added to the selected pixel data is reset to 0 and the processing is terminated.

In contrast to this, when it proceeds to step S106, the processing is terminated without updating the making time code added to the selected pixel data (while maintaining the making time code). For example, when the making time code is "0," "0" is maintained as it is.

The attribute data update processing in the first judging section 20 will next be explained on the basis of FIG. 8(*b*).

As shown in FIG. 8(*b*), it first proceeds to a step S200, and pixel data after the pixel value update processing using the second HDR-RAW data precedently outputted and after the update processing of the making time code in the above FIG. 8(*a*) is selected. It then proceeds to step S202.

In step S202, it is judged whether the pixel data selected in step S200 is pixel data updated by the first HDR-RAW data or not. When it is judged that the selected pixel data is the updated pixel data (Yes), it proceeds to step S204. In contrast to this, when it is judged that no selected pixel data is the updated pixel data (No), it proceeds to step S206.

When it proceeds to step S204, the making time code added to the selected image data is reset to 0 and the processing is terminated.

In contrast to this, when it proceeds to step S206, the making time code added to the selected pixel data is incremented by one and the processing is terminated. Namely, when the making time code is "0," the making time code is incremented by one and is updated to "1".

<Operation of Image Pickup Device>

Next, the operation of the image pickup device of this embodiment mode will be explained in detail.

Here, the image pickup device for changing the exposure time in the pixel series (line) unit is used.

Now, the image pickup operation is executed in some frames so that the ALC operation is converged and the exposure time is calculated for each pixel series. It is then supposed that an electric charge group of the image picked up for the standard exposure time is converted into a voltage group by the area sensor 7 of the image pickup element 5 in an N-th line by scanning the reading-out/reset line 2. Thus, the voltage group converted in the pixel series shown by the driving signal outputted from the timing control section 11 of the signal processing section 3 is read out by the horizontal transfer section 8. This read-out voltage group is outputted to the second AFE 6' through the second output channel of the horizontal transfer section 8. On the other hand, the short exposure time has passed after the reset of the pixel of the N-th line by scanning the reading-out/reset line 2, and the electric charge group of the image picked up for the short exposure time is converted into a voltage group by the area sensor 7 of the image pickup element 5 in the N-th line by scanning the reading-out/reset line 1. Thus, the voltage group converted in the pixel series shown by the driving signal outputted from the timing control section 11 of the signal processing section 3 is read out by the horizontal transfer section 8. This read-out voltage group is outputted to the first AFE 6 through the first output channel of the horizontal transfer section 8. The analog data respectively outputted from the first and second output channels is outputted to the first AFE 6 and the second AFE 6' with a predetermined phase difference (a difference of at least the short exposure time or more). Namely, the analog data corresponding to the standard exposure time are precedently outputted from the second output channel. Thereafter, the analog data corresponding to the short exposure time is outputted from the first output channel with the predetermined phase difference.

Further, the digital image data is generated by the first AFE 6 and the second AFE 6' on the basis of the respective outputted voltage groups of the different exposure times. The generated digital image data is outputted to the image synthesizing section 9 (the first preprocess 13 and the second preprocess 13') of the signal processing section 3. Further, the respective outputted digital image data of the different exposure times is corrected to black levels by the first preprocess 13 and the second preprocess 13'. The digital image data corrected to the black levels is outputted to the ALC 12, the first HDR-RAW generator 14 and the second HDR-RAW generator 14' (the first HDR-RAW input data generating section 17 and the second HDR-RAW input data generating section 17'). Further, the first preprocess 13 and the second preprocess 13' judge unsaturation/saturation of the digital image data, and output its result (saturation flag) to the first HDR-RAW generator 14 and the second HDR-RAW generator 14' (the first HDR-RAW input data generating section 17 and the second HDR-RAW input data generating section 17').

The ALC 12 outputs the exposure time of the digital image data inputted at present on the basis of the address information outputted from the timing control section 11, and outputs this exposure time to the first and second HDR-RAW generators 14 (the HDR-RAW input data generating section 17) of the image synthesizing section 9 and the timing control section 11. Thus, the attribute data of the digital image data is added to the digital image data by the first HDR-RAW input data generating section 17 and the second HDR-RAW input data generating section 17'. Thus, the second HDR-RAW data corresponding to the standard exposure time and the first HDR-RAW data corresponding to the short exposure time are respectively generated. At this time, the saturation flag, the making time code and the exposure code are added as the attribute data. The exposure code is calculated from the exposure time. The generated first and second HDR-RAW data are outputted to the first and second input data accumulating sections 18 and 18' by the first and second HDR-RAW input data generating sections 17 and 17'. Then, the generated HDR-RAW data is accumulated by one pixel series by the first and second input data accumulating sections 18 and 18'.

On the other hand, the read-out command is outputted to the memory arbiter 15 by the second BRAM data accumulating section 19' in parallel with the accumulating operation of the second HDR-RAW input data. At this time, the address information of the pixel series corresponding to the digital image data (the second HDR-RAW data) inputted at present and a control signal synchronized with the horizontal synchronous signal is inputted from the timing control section 11 to the second BRAM data accumulating section 19'. The read-out command based on this address information and the control signal is outputted to the memory arbiter 15. The memory arbiter 15 reads the HDR-RAW data out of the BRAM 10 on the basis of the above read-out command. The read-out HDR-RAW data is then accumulated by one pixel series by the second BRAM data accumulating section 19'.

Here, for brevity of explanation, each pixel series is constituted by 10 pixels. With respect to the second HDR-RAW data accumulated in the second input data accumulating section 18', the saturation flag of the attribute data is "1" in first to second and fifth to seventh pixels from the left-hand end side seen from a plane of the pixel series. Further, with respect to the HDR-RAW data accumulated in the second BRAM data accumulating section 19', the saturation flag is "1" in second to fourth and eighth to tenth pixels from the left-hand end side seen from the plane of the pixel series. Further, all the making time data of the HDR-RAW data accumulated in the second BRAM data accumulating section 19' are "0." It is also supposed that the exposure codes of all the HDR-RAW data accumulated in the second input data accumulating section 18' are "1," and the exposure codes of all the HDR-RAW data accumulated in the second BRAM data accumulating section 19' are "1" so that both the values are equal. On the basis of the attribute data, the second data judging section 20' compares and judges the second HDR-RAW input data accumulated in the second input data accumulating section 18', with the HDR-RAW input data accumulated in the second BRAM data accumulating section 19' for each pixel. At this time, the second data judging section 20' compares the HDR-RAW data at the same pixel position, and it becomes necessary to update the HDR-RAW data of third to fourth and eighth to tenth pixels from the left-hand end side seen from the plane from its comparison result. Further, on the basis of its judging result, with respect to the HDR-RAW data of the first to second and fourth to seventh pixels from the left-hand end side seen from the plane, the second data judging section 20' selects the HDR-RAW data of the second BRAM data accumulating section 19'. Further, with respect to the HDR-RAW data of the third to fourth and eighth to tenth pixels from the left-hand end side seen from the plane, the second data judging section 20' selects the second HDR-RAW data of the second input data accumulating section 18'. The selected HDR-RAW data is combined so that the HDR-RAW data of one pixel series is updated. At this time, the update processing of the attribute data of the HDR-RAW data updated by the second HDR-RAW data is also performed. The exposure code and the saturation flag are provided from the HDR-RAW data selected from the second HDR-RAW data and the HDR-RAW data of the second BRAM data accumulating section 19'. With respect to the making time code, the making time code of the HDR-RAW data of the third to fourth and eighth to tenth pixels from the left-hand end side seen from the plane and updated by the second HDR-RAW data is cleared to "0." The making time code of the HDR-RAW data of the first to second and fifth to seventh pixels from the left-hand end side seen from the plane is maintained as "0" as it is. The write-in command is then outputted to the memory arbiter 15 by the second data updating section 21'. The updated HDR-RAW data is written into the BRAM 10 by the memory arbiter 15. At this time, the writing-in operation is performed in an area of the corresponding pixel series (address information) of the BRAM 10.

On the other hand, when the first HDR-RAW data is accumulated in the first input data accumulating section 18 with a predetermined phase difference, the read-out command is outputted to the memory arbiter 15 by the first BRAM data accumulating section 19. At this time, the address information of the pixel series corresponding to the digital image data (first HDR-RAW data) inputted at present, and the control signal synchronized with the horizontal synchronous signal are inputted from the timing control section 11 to the first BRAM data accumulating section 19. The read-out command based on this address information and the control signal is outputted to the memory arbiter 15. The memory arbiter 15 reads the HDR-RAW data after the update processing using the second HDR-RAW data out of the BRAM 10 on the basis of the above read-out command. The read-out HDR-RAW data is accumulated by one pixel series by the first BRAM data accumulating section 19.

Here, with respect to the first HDR-RAW data accumulated in the first input data accumulating section 18, the saturation flag of the attribute data is "0" in first to eighth pixels from the left-hand end side seen from the plane of the pixel series. The exposure codes of all the first HDR-RAW data accumulated in the first input data accumulating section 18 are "2." On the other hand, with respect to the HDR-RAW data accumulated in the first BRAM data accumulating section 19, the saturation flags except for the second pixel from the left-hand end side seen from the plane become "0" by the above update. The making time code of the attribute data is "0" in all the pixels of the HDR-RAW data accumulated in the first BRAM data accumulating section 19.

On the basis of the attribute data, the first data judging section 20 compares and judges the first HDR-RAW input data accumulated in the first input data accumulating section 18, with the HDR-RAW input data accumulated in the first BRAM data accumulating section 19. At this time, the HDR-RAW data at the same pixel position is compared, and it is judged from its comparing result whether it is necessary to update the HDR-RAW data of the second pixel from the left-hand end side seen from the plane. Further, on the basis of the judging result, the first data judging section 20 selects the HDR-RAW data of the first BRAM data accumulating section 19 with respect to the HDR-RAW data of the first and third to tenth pixels from the left-hand end side seen from the plane. The first data judging section 20 also selects the first HDR-RAW data of the first input data accumulating section 18 with respect to the HDR-RAW data of the second pixel from the left-hand end side seen from the plane. These selected HDR-RAW data is synthesized so that the HDR-RAW data of one pixel series is updated. At this time, the update processing of the attribute data of the HDR-RAW data updated by the first HDR-RAW data is also performed. The exposure code and the saturation flag are provided from the HDR-RAW data selected from the first HDR-RAW data and the HDR-RAW data of the first BRAM data accumulating section 19. With respect to the making time code, the making time code of the HDR-RAW data of the second pixel from the left-hand end side seen from the plane and updated by the first HDR-RAW data is cleared to "0." The making time codes of the HDR-RAW data of the first and third to tenth pixels from the left-hand end side seen from the plane and not updated by the first HDR-RAW data are incremented by one, and are set to "1." The write-in command is outputted to the memory arbiter 15 by the first data updating section 21. These updated HDR-RAW data are written into the BRAM 10 by the memory arbiter 15. At this time, the writing-in operation is performed in the area of a corresponding pixel series (address information) of the BRAM 10.

The above flows are then also repeated with respect to the pixel series of other rows.

Thus, in the image pickup device of this embodiment mode, when the saturation flag of the HDR-RAW data accumulated in the second BRAM data accumulating section 19' is "1" and the saturation flag of the second HDR-RAW data accumulated in the second input data accumulating section

18' is "0," i.e., when a pixel in the saturated state no longer attains the saturated state, the HDR-RAW data accumulated in the second input data accumulating section 18' is recorded to the BRAM 10 instead of the HDR-RAW data recorded so far. Further, after the update processing using the second HDR-RAW data, when the saturation flag of the HDR-RAW data is "1" and the saturation flag of the first HDR-RAW data accumulated in the first input data accumulating section 18 and picked up for an exposure time shorter than that of the second HDR-RAW data is "0," i.e., when the pixel attaining the saturated state so far attains no saturated state by shortening the exposure time, the HDR-RAW data accumulated in the first input data accumulating section 18 is recorded to the BRAM 10 instead of the HDR-RAW data recorded so far. Thus, the image data of the image of a wide dynamic range can be generated.

Further, in accordance with this embodiment, a frame memory required to be synchronized with the operation of the display device/image processor can be also used as a buffer for delay. Therefore, for example, after a first image is picked up, a second image is picked up and the image data of the first image is delayed by a delay element. The image data of the first image is then outputted simultaneously with the image data of the second image. Instead of the image data of a pixel providing a maximum value of the dynamic range with respect to the brightness value within this delayed first image, the image data of the pixel within the second image is recorded. Thus, unlike the conventional method for generating the image data of the image of a wide dynamic range, it is not necessary to arrange the delay element. As its result, manufacture cost can be reduced by the amount for arranging the delay element.

As mentioned above, in the above second embodiment mode, the first and second HDR-RAW input data generating sections 17 and 17' constitute an attribute information adding unit. Hereinafter, the first and second input data accumulating sections 18, 18', the first and second BRAM data accumulating sections 19, 19', the first and second data judging sections 20, 20' and the first and second data updating sections 21, 21' similarly constitute a pickup image generating unit. The first and second data judging sections 20, 20' constitute a selecting condition judging unit. The first and second data judging sections 20, 20' and the first and second data updating sections 21, 21' constitute a selecting pixel synthesizing unit. The BRAM 10 constitutes a recording unit.

The image pickup device of the invention is not limited to the contents of the above embodiments, but can be suitably modified in a scope not departing from the features of the invention.

For example, the exposure code showing the exposure time at the generating time of the image data, the saturation flag showing that the brightness value of the image data is a maximum value of the dynamic range, and the making time code showing a generating time of the image data are used as the attribute data. However, attribute data is not necessarily limited to these examples. For example, data specific to a pixel can be also further added. For example, data indicating a defective pixel, etc.

The invention is applied to the image pickup device. However, it is clear that an idea for giving the attribute data for each pixel and performing the image processing and the image synthesis on the basis of these attribute data can be also adapted to a general image processor.

What is claimed is:

1. An image pickup device comprising:
an image pickup unit having an electronic shutter function that is able to change an exposure time, the image pickup unit picking up an image formed of a plurality of pixels;
an attribute information adding unit for adding attribute information to the plurality of pixels of the image, said attribute information including an image pickup condition of the pixels of the image picked up by the image pickup unit;
a pickup image generating unit for generating a pickup image by selecting the image of every pixel on the basis of the added attribute information;
a selecting condition judging unit for judging whether the attribute information added to each pixel by said attribute information adding unit satisfies a selecting condition for selecting a pixel that corresponds to the attribute information;
a selecting pixel synthesizing unit for selecting the pixel corresponding to the attribute information judged so as to satisfy selecting condition, and generating the pickup Image;
a recording unit for recording the image picked up by said image pickup unit, and,
when it is judged that the attribute information of the pixel included in the image picked up later by said image pickup unit satisfies said selecting condition, said selecting pixel synthesizing unit replaces the pixel with a corresponding pixel of the pickup image recorded to said recording unit;
wherein the attribute information of said pixel includes at least one of information showing an exposure time of said pixel, information showing that a brightness value of said pixel is an upper limit value of a dynamic range, and information showing an image pickup time of said pixel;
wherein said selecting condition judging unit sequentially executes from a higher preferential order processes for judging whether the selecting condition of said pixel is satisfied a first judgment process for judging whether the image pickup time of an object pixel of the image newly picked up is separated from the image pickup time of the corresponding pixel of the pickup image recorded to said recording unit by a predetermined time or more on the basis of said attribute information added to each pixel;
a second judgment process for judging whether or not the brightness value of the object pixel of the image newly picked up is smaller than the upper limit value of the dynamic range and the brightness value of the corresponding pixel of the pickup image recorded to said recording unit is greater than the upper limit value of the dynamic range; and
a third judgment process for judging whether or not the exposure time of the object pixel of the image newly picked up is longer than the exposure time of the corresponding pixel of the pickup image recorded to said recording unit when the brightness value of the object pixel of the image newly picked up is smaller than the upper limit value of the dynamic range and the brightness value of the corresponding pixel of the pickup image recorded to said recording unit is smaller than the upper limit value of the dynamic range;
wherein said judgment processes are terminated when said selecting condition is satisfied in one of said first to third judgment processes.

2. An image pickup device comprising:
a photoelectric converting section having a plurality of photoelectric converting elements for converting exposed light into electric charges and accumulating the electric charges, the photoelectric converting section arranged in a matrix shape;
an electric shutter function able to change an exposure time for every line of photoelectric converting elements that constitute said photoelectric converting element in said photoelectric converting section;
an image pickup unit for sequentially performing a reset of each of said photoelectric converting elements, and an exposure and reading of the electric charges out of each of said photoelectric converting elements for every line different in said exposure time; and
N-output channels (N being a natural number of 2 or more) that respectively corresponds to N-kinds of exposure times, the N-output channels recording and outputting image data corresponding to the electric charges in each of said lines read out for every kind;
wherein the image pickup device further comprises:
an attribute information adding unit for adding attribute information including an image pickup condition of a pixel to data of each pixel constituting image data of the pickup image picked up by said image pickup unit;
a recording unit for recording the image data of the pickup image to which said attribute information is added;
a selecting condition judging unit for judging, for each pixel, whether the attribute information added to the data of each pixel satisfies a preset selecting condition of the pixel on the basis of the attribute information added to the image data of each line sequentially outputted in a predetermined order from said N-output channels for every kind of said exposure time, and the attribute information added to the image data of the line corresponding to the image data of said each line recorded to said recording unit and
a pickup image generating unit for selecting the data of the pixel corresponding to the attribute information judged so as to satisfy said selecting condition, and recording the data of the selected pixel to said recording unit, and updating or maintaining the image data of said pickup image recorded to the recording unit for each pixel;
wherein the attribute information added to the data of said each pixel includes at least one of information showing an exposure time of said pixel, information showing that a brightness value of said pixel is an upper limit value of a dynamic range, and information showing an image pickup time of said pixel;
wherein said selecting condition judging unit sequentially executes from a higher preferential order processes for judging whether the selecting condition of said pixel is satisfied, a first judgment process for judging whether the image pickup time of the data of an object pixel in the image data outputted from said output channel is separated from the image pickup time of the data of the corresponding pixel of the image data recorded to said recording unit by a predetermined time or more on the basis of the attribute information added to the data of each pixel;
a second judgment process for judging whether the brightness value of the data of the object pixel in the image data outputted from said output channel is smaller than the upper limit value of the dynamic range and the brightness value of the data of the corresponding pixel in the image data recorded to said recording means unit is greater than the upper limit value of the dynamic range; and
a third judgment process for judging whether the exposure time of the data of the object pixel in the image data outputted from said output channel is longer than the exposure time of the data of the corresponding pixel in the image data recorded to said recording unit when the brightness value of the data of the object pixel in the image data outputted from said output channel is smaller than the upper limit value of the dynamic range and the brightness value of the data of the corresponding pixel of the image data recorded to said recording unit is smaller than the upper limit value of the dynamic range;
wherein said judgment processes are terminated when said selecting condition is satisfied in one of said first to third judgment processes.

3. The image pickup device according to claim 2, wherein, information showing said image pickup time added to the data of a pixel not updated in record by said pickup image generating unit within the data of the pixel constituting the image data recorded to said recording unit on a line corresponding to the line of the image data outputted from each output channel is changed to information showing the image pickup time passing a predetermined time by said pickup image generating unit; and
said pickup image generating unit resets to a predetermined value, information showing said image pickup time added to the data of the pixel updated in record by said pickup image generating unit within the data of the pixel constituting the image data recorded to said recording unit on the line corresponding to the line of the image data outputted from each output channel.

4. An image pickup device comprising:
an area sensor having a plurality of pixels;
an input data generating section receiving first image data corresponding to a first pixel of the plurality of pixels, receiving second image data corresponding to the first pixel of the plurality of pixels, adding a first exposure code and a first saturation flag to the first image data and generating third image data, and adding a second exposure code and a second saturation flag to the second image data and generating fourth image data, the first exposure code indicating an exposure time at the generating time of the first image data, the first saturation flag indicating whether a brightness value of the first image data is a maximum value of a dynamic range or not, the second exposure code indicating an exposure time at the generating time of the second image data, and the second saturation flag indicating whether a brightness value of the second image data is a maximum value of a dynamic range or not;
a memory storing the third image data, the third image data generated prior to the fourth image data at the input data generating section; and
a data judging section comparing the third image data with the fourth image data, the data judging section replacing the third image data with the fourth image data when the first saturation flag indicates a brightness value of the first image data is not a maximum value of a dynamic range, a brightness value of the second image data is not a maximum value of a dynamic range, and the exposure time at the generating time of the first image data is shorter than the exposure time at the generating time of the second image data.

5. The image pickup device according to claim 4, the input data generating section further adding a first making time code to the first image data and generating the third image data, a second making time code to the second image data and generating the fourth image data, the first making time code indicating by which frame the first image data is generated, and the second making time code indicating by which frame the second image data is generated.

6. The image pickup device according to claim 4, the data judging section replacing the third image data with the fourth image data when a frame in which the first image data is generated is two frames older than a frame in which the second image data is generated.

7. The image pickup device according to claim 4, further comprising:
- a first data accumulating section accumulating the third image data; and
- a second data accumulating section accumulating the fourth image data.

8. A signal processing section receiving first image data and second image data from a pickup image processing section including an area sensor having a plurality of pixels, the first image data corresponding to a first pixel of the plurality of pixels, the second image data corresponding to the first pixel of the plurality of pixels, the signal processing section comprising:
- an input data generating section adding a first exposure code, a first saturation flag, and a first making time code, to the first image data and generating a third image data, and adding a first exposure code and a first saturation flag to the first image data and generating third image data, and adding a second exposure code and a second saturation flag to the second image data and generating fourth image data, the first exposure code indicating an exposure time at the generating time of the first image data, the first saturation flag indicating whether a brightness value of the first image data is a maximum value of a dynamic range or not, the second exposure code indicating an exposure time at the generating time of the second image data, and the second saturation flag indicating whether a brightness value of the second image data is a maximum value of a dynamic range or not;
- a memory storing the third image data, the third image data generated prior to the fourth image data at the input data generating section; and
- a data judging section comparing the third image data with the fourth image data, the data judging section replacing the third image data with the fourth image data when the first saturation flag indicates a brightness value of the first image data is not a maximum value of a dynamic range, a brightness value of the second image data is not a maximum value of a dynamic range, and the exposure time at the generating time of the first image data is shorter than the exposure time at the generating time of the second image data.

9. The signal processing section according to claim 8, the input data generating section further adding a first making time code to the first image data and generating the third image data, a second making time code to the second image data and generating the fourth image data, the first making time code indicating by which frame the first image data is generated, and the second making time code indicating by which frame the second image data is generated.

10. The signal processing section according to claim 9, the data judging section replacing the third image data with the fourth image data when a frame in which the first image data is generated is two frames older than a frame in which the second image data is generated.

11. The signal processing section according to claim 8, further comprising:
- a first data accumulating section accumulating the third image data; and
- a second data accumulating section accumulating the fourth image data.

\* \* \* \* \*